COLOR TELEVISION IMAGE REPRODUCING SYSTEM

Filed June 17, 1950 2 Sheets-Sheet 1

INVENTORS
GEORGE C. SZIKLAI
& FRANCIS J. DARKE, JR.
BY
ATTORNEY

COLOR TELEVISION IMAGE REPRODUCING SYSTEM

Filed June 17, 1950 2 Sheets-Sheet 2

INVENTORS
GEORGE C. SZIKLAI
& FRANCIS J. DARKE, JR.
BY
ATTORNEY

Patented July 21, 1953 2,646,462

UNITED STATES PATENT OFFICE 2,646,462

COLOR TELEVISION IMAGE REPRODUCING SYSTEM

George C. Sziklai and Francis J. Darke, Jr., Princeton, N. J., assignors to Radio Corporation of America, a corporation of Delaware Application June 17, 1950, Serial No. 168,816

22 Claims. (Cl. 178—5.4)

This invention relates to television systems. It has particular reference to systems of the character embodying apparatus for reproducing an image substantially in its natural colors.

It has been recognized that some of the more popular types of sequential television systems have certain inherent disadvantages. Among them are color flicker, color action fringes and the like. In order to avoid such disadvantages it has been proposed to operate color television systems according to the so-called simultaneous process. According to this method, the video signals representing the color component colors of the image are transmitted and received substantially simultaneously. The principles underlying the simultaneous color television system are disclosed in U. S. Patent 2,335,180, granted November 23, 1943, to A. N. Goldsmith and titled "Television System." According to the Goldsmith system, the different video signals are transmitted and received over individual communication channels.

Another color television system which does not have the inherent disadvantages of other types of sequential systems, such as those referred to, is the system forming the subject matter of copending U. S. application of John Evans, Ser. No. 111,384, filed August 20, 1949, and titled "Color Television." The Evans system operates in accordance with the so-called dot or elemental multiplex principles. The video signals representing the different component colors of the image are in the form of impulses, each of which represents the color intensity of an elemental area of the image. In a three color system, the red, green and blue video signals are transmitted successively for each of the multiplicity of elemental image areas.

While the systems such as represented by the Goldsmith patent and the Evans application referred to, avoid certain of the disadvantages of the sequential types of systems there frequently is encountered in the image-reproducing apparatus the problem of effecting accurate registration of the different component color images.

Accordingly, it is an object of this invention to provide an improved color television system.

Another object of the invention is to provide a system for reproducing color television images in which problems of registering the component color images are minimized.

Still another object of the invention is to provide a single cathode ray tube for reproducing color television images in a novel manner in a plurality of different component colors by means of a single electron beam.

According to the invention, there is provided a color television image-reproducing system in which a single electron beam of a cathode ray tube is deflected by a single deflection system. There is derived from the beam, separate components which are used to excite different luminescent screens. The screens are instrumental, respectively, of producing light corresponding in color to the component image colors. The differently colored light produced by means including these screens, then, is optically combined in register to form a composite color television image. The color television image-reproducing system in accordance with the invention may be used in either simultaneous systems of the type disclosed in the Goldsmith patent or in time division multiplexing systems as disclosed in the copending Evans application referred to.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figures 1, 2:
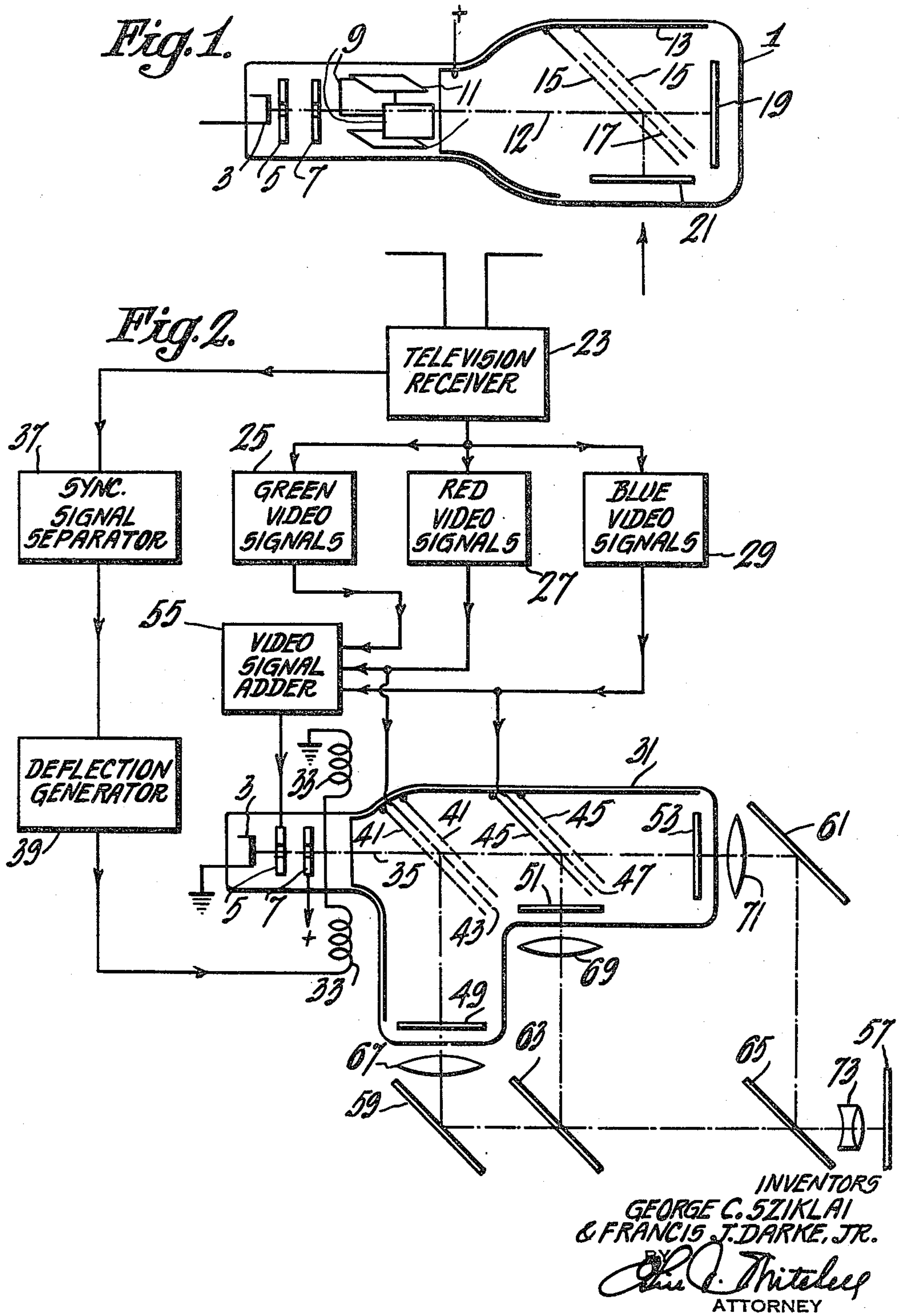
Figure 1 shows schematically a representative form of the invention.
Figure 2 is a circuit diagram mostly in block form showing schematically a television image reproducing system in accordance with this invention.

Referring now to Figure 1, there is illustrated schematically a color television cathode ray image-reproducing tube 1. The tube 1 includes an electron beam 12 producing means such as an electron gun. The electron gun consists of a cathode 3, a control electrode 5 which modifies the intensity of said beam and a focusing electrode 7. The tube 1 also includes two pairs of deflection plates 9 and 11 which deflect the electron beam 12 both in horizontal and vertical directions to scan a complete raster at a target electrode located in any plane at a predetermined focal distance from the electron gun.

The operation of the electron gun and the deflecting plates is well known. Accordingly, further description of these elements will be omitted. It also will be understood that, instead of the electrostatic deflection indicated, electromagnetic deflection may be employed in the practice of this invention, as indicated in other illustrative embodiments thereof.

The electron beam 12 traverses a homogeneous field provided by a wall coating 13 on the inside of the tube 1 and a screen structure including a pair of spaced grids 15. These grids and the wall coating are connected to the same high positive potential source. The screen grids 15 are part of an electron mirror having additionally a center screen grid electrode 17. The range of potentials impressed upon the grid 17 is kept in the close neighborhood of the electron beam emitting cathode 3.

The magnitude of the potential applied to electrode 17 affects the transmission of the electron beam through the screen structure. When electrode 17 is more negative than the slowest electron emitted by cathode 3, all electrons will be reflected downwardly. The angle made by the reflected beam with a line normal to the screen will be the same as the angle of incidence of the original beam relative to the normal line. When electrode 17 is more positive than the fastest electron emitted by cathode 3, all electrons will pass through the screens 15 and 17. The directions of either the through or reflected beam paths is determined by the scanning field produced by deflection plates 9 and 11. If electrode 17 is at a potential between these two extreme values, the slower electrons in the beam will be reflected and the faster ones transmitted. The proportion of reflected to transmitted electrons will be in accordance with the aforesaid potential.

After the electron beam has passed the screen grids 15 and 17, either by transmission or reflection, it is in a homogeneous field and is accelerated accordingly to the potentials of a pair of target electrodes such as luminescent screens 19 and 21. These electrodes function to translate the electron beam energy into visible radiation.

The screen structure including grids 15 and 17 may be similar in construction to the screen structure disclosed in the copending U. S. application of George C. Sziklai and Alfred C. Schroeder, Serial No. 23,914, filed April 29, 1948, and entitled "Simultaneous Color Television Optical System." In that application, the reflecting and transmitting properties of such a screen structure are explained in detail. It may suffice here to point out that screen 17 acts as a velocity filter or sorting electrode. It permits the transmission of electrons above a certain velocity and reflects electrons with lower velocities. The certain electron velocity is dependent upon the potential applied to screen 17.

The thermionic cathode 3 emits electrons with a finite range of velocities according to Maxwellian distribution. Therefore, if screen 17 has a potential which is variable around a value corresponding to the electron emission velocities, the instantaneous distribution of the electrons between luminescent screens 19 and 21 may be conveniently changed. Other types of cathodes may have different velocity distributions but will always provide electrons with a finite velocity range. With increasing potential on filter screen 17, the number of electrons provided for luminescent screen 19 will be increased. A lowering of the potential on screen 17 will provide a greater number of electrons for screen 21. Since electrode 17 changes only the ratio of brightness between the luminescent screens 19 and 21, a control of the total brightness of the reproduced image must be provided by means of a signal applied to the control grid 5. The provision of these controls is described in greater detail in the following figures of the drawings.

Referring now to Figure 2, wherein like numerals refer to similar elements, there is illustrated a television receiver 23. It may be of the type shown and described in the copending U. S. application of George C. Sziklai entitled "Signal Separator," Serial No. 760,400, filed July 11, 1947, now Patent No. 2,626,323, issued January 20, 1953. This Sziklai application discloses a novel arrangement for improved reception of color television signals. Reception is effected by dividing out the different selected component color image-representative signal trains after some intermediate frequency amplification. However, any suitable type of color television receiver arrangement may be employed so long as it will provide three independent signal trains. These signal trains are designated in Figure 2 as green video signal channel 25, red video signal channel 27 and blue video signal channel 29.

The image-reproducing tube 31 is provided with an electron gun including a cathode 3, a control electrode 5 and a focusing or beam-forming electrode 7. The tube 31 also includes a deflecting system 33. It will be understood that the single pair of coils shown symbolizes a system for effecting both horizontal and vertical deflection of an electron beam 35 so as to scan the usual television raster.

A synchronizing signal separator 37 and a deflection generator 39 are provided for synchronous control of electron beam deflection in a manner well known in the art. In accordance with the explanation given previously in connection with Figure 1, it will be understood that the electron beam 35 is directed toward a first electron mirror including screens 41 and 43. The portion of the electron beam 35 which is transmitted through the electron mirror including screens 41 and 43 is directed toward a second electron mirror consisting of screens 45 and 47. Again it will be seen that a portion of the electron beam 35 will be reflected downwardly by the electron mirror including screens 45 and 47.

The portion of the electron beam 35 which is reflected by the electron mirror including screen 43 impinges upon the target electrode 49, at which point the beam is focused.

That portion of the beam 35 which passes through the electron mirror including screen 43 and is reflected downwardly from screen 47 impinges upon another target electrode 51.

The remainder of the electron beam 35 which is not reflected by either of the electron mirrors will continue on to impinge upon a third target electrode 53.

Target electrodes 49, 51 and 53 are made of different color-producing luminescent materials or may have different color filter associated therewith. In any case, it will be understood that component color images will be formed by means including each of the screens 49, 51 and 53.

The relative brilliance of the component color images formed on screens 49, 51 and 53 must, however, be individually controlled. This is accomplished by controlling the potential of screen electrodes 43 and 47 with a signal. In this particular arrangement, an increase in a negative direction of the potential applied to screens 43 and 47 will increase the brightness of the images produced on the image screens 49 and 51, respectively.

As has been explained in connection with Figure 1, a control of the total brilliance must be provided on control grid 5. This is obtained by adding the total signal intensities by a video signal adder 55. This apparatus simply totals the signal intensities of all three video signal channels 25, 27 and 29. A suitable signal adder 55 is shown and described in the copending U. S. application of George C. Sziklai entitled "Television System," Serial No. 788,746, filed November 28, 1947, now Patent No. 2,566,707, issued September 4, 1951.

Having produced the separate component color images upon the screens 49, 51 and 53 in the manner described, it is merely necessary to combine them optically to produce a natural color image upon a viewing screen 57. This is accomplished by employing two mirrors 59 and 61, together with a pair of dichroic mirrors 63 and 65. Dichroic mirror 63 functions to reflect blue light and to transmit red light. Dichroic mirror 65 reflects green light and transmits red and blue light.

Although not shown, color filters of the appropriate colors may also be employed instead of or in addition to the different color-producing luminescent screens 49, 51 and 53.

The optical system, as shown, includes lenses 67, 69 and 71, together with a projection lens 73. When a combination of all four lenses is used, lenses 67, 69 and 71 may be of a low power and non-corrected type. In such a case most of the power and correction preferably should take place in the complex projection lens 73.

Figures 3, 4:
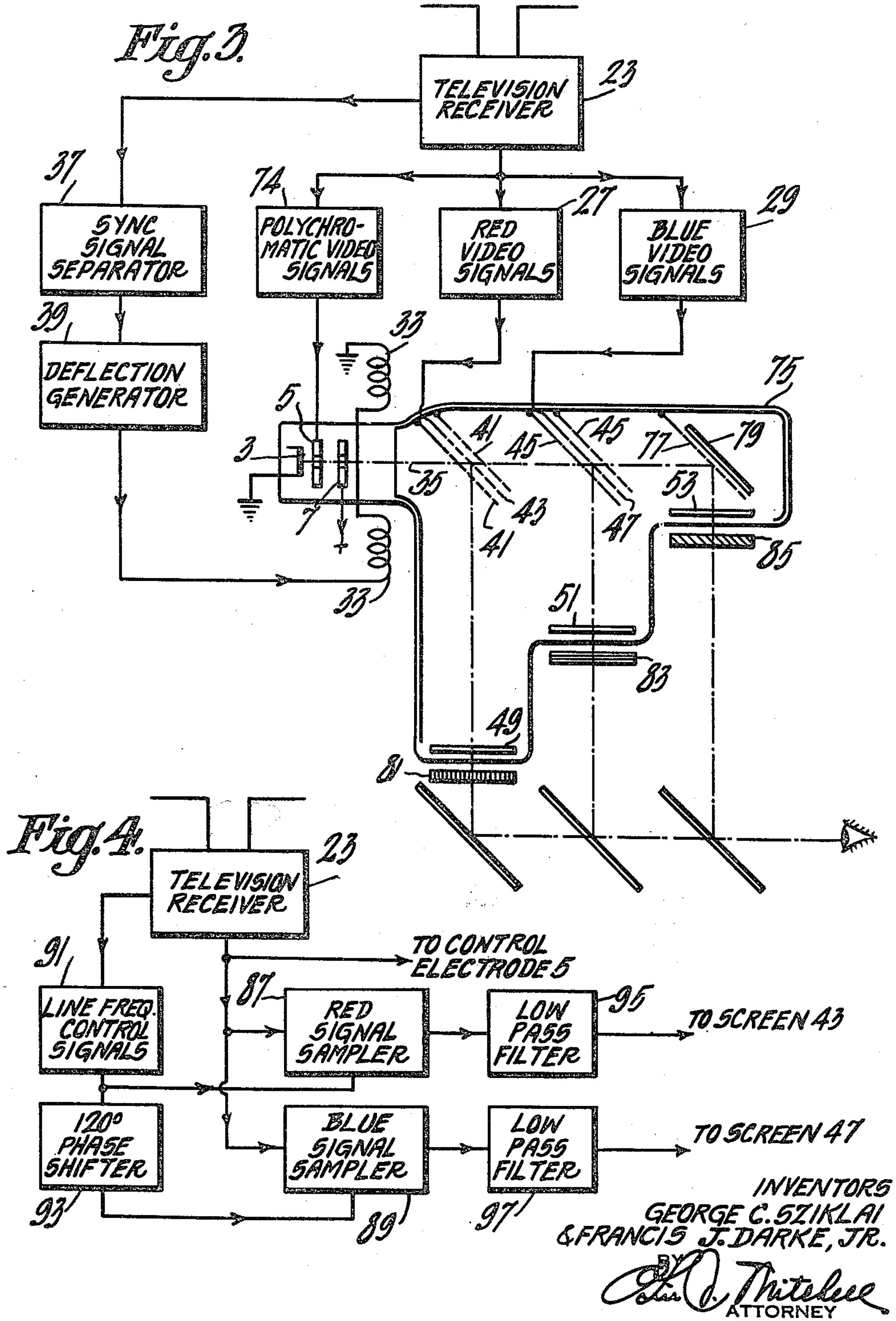
Figure 3 is another circuit diagram mostly in block form showing another illustrative embodiment of the invention.
Figure 4 is a fragmentary block circuit diagram of an embodiment of the invention in a time division multiplex system.

Referring now to Figure 3, there is shown another form of this invention. In this system, there is illustrated the employment of a panchromatic video signal 74 with red and blue video signals 27 and 29, respectively. There is also shown a direct viewing optical arrangement which may be substituted for the projection system shown in Figure 2.

The generation and utilization in a color television system of a panchromatic video signal, together with the red representative video signal and the blue representative video signal, is shown and described in the copending U. S. application of Alda V. Bedford entitled "Television System," Serial No. 714,322, filed December 5, 1946, now Patent No. 2,559,843, issued July 10, 1951.

The operation of the tube 75 is similar to the operation of tube 31 of Figure 2, except for the fact that another electron mirror consisting of screen 77 and screen or plate 79 is employed to reflect electronically all electrons reaching this electron mirror. Optical color filters 81, 83 and 85 are also shown to provide greater saturation of the reproduced image.

Referring now to Figure 4 an embodiment of the invention in a somewhat different type of television system will be described. The cathode ray tube structure may be similar to any of those previously described. Therefore, reference is made only to the signal-receiving portion of the system. This system is of the so-called dot or elemental multiplex type. A representative system of this character is described in the copending application of John Evans previously referred to. In this type of system the video signals are generated, transmitted, and received on a time division multiplex basis.

The component color information of each elemental area of the image is transmitted successively for each of the multiplicity of such areas. In generating video signals for a system of this type, the individual video signals representing the different component image colors are sampled respectively, at time-spaced intervals. The different color representation samples are combined in a low pass filter having a cutoff frequency considerably lower than the second harmonic of the signal sampling frequency. A composite video signal is developed in this manner. Other examples of systems of the character described comprise the subject matter of a copending U. S. application of Clarence W. Hansell, Serial No. 124,034, filed October 28, 1949, and titled "Color Transmission System" and a copending U. S. application of William D. Houghton, Serial No. 157,148, filed April 20, 1950, and titled "Color Television System."

In order to reproduce images substantially in their component colors from a multiplex signal of the character described, it is necessary that the composite signal be sampled suitably at the receiving point. Therefore, it will be understood that the television receiver 23 of Figure 4 receives and reproduces in its output circuit a composite video signal of the dot or elemental multiplex type. The composite signal is impressed upon the control electrode 5 of the cathode ray tube as indicated. Accordingly, the intensity of the electron beam is modulated in accordance with the composite video signal.

The composite video signal derived from the receiver 23 also is sampled by red and blue signal samplers 87 and 89, respectively. The samplers may be gating circuits upon which the composite video signal is impressed at all times. The samplers are energized at suitable times to pass the individual color signals to their respective output circuits. The control of the samplers 87 and 89 is effected by a source 91 of control signals produced at line scanning frequency. This signal source may be controlled from the horizontal synchronizing signals derived from the receivers 23. The control signal source 91 is coupled directly to the red signal sampler 87. In order to properly time the operation of the blue signal sampler 89, the control signal source 91 is coupled to the sampler 89 through a phase shifter 93. The phase shifter produces substantially a 120° phase shift of the control signals.

The red and blue signals derived from the samplers 87 and 89, respectively, are impressed upon the velocity filter screens 43 and 37 of the cathode ray tube after passing through filters 95 and 97, respectively. These filters are of the low pass type, capable of transferring signals having frequencies up to 2 megacycles, for example. In a particular case, the frequency content of the composite video signals impressed upon the samplers varies from 0 to 4 megacycles. Also, in this case, the sampling frequency is approximately 3.6 megacycles. Accordingly, it is seen that by reason of the use of the low pass filters 95 and 97, there is impressed upon the screens 43 and 47 control signal voltages which are substantially simultaneous. The operation of the cathode ray tube on the control of signals of the character described is similar to the tubes previously described.

What is claimed is:

1. In a television system for reproducing an image substantially in its component colors from received video signals, a cathode ray tube including two luminescent screens capable respectively of producing light corresponding in color to two of said component image colors, said screens being disposed in different planes, means to produce a single electron beam with which to scan and selectively excite said screen, and electron-optical means to derive from said scanning beam, and to direct respectively to said screens, substantially simultaneous separate beam components having relative intensities corresponding to the relative intensities of said component image colors.

2. A color television reproducing system as defined in claim 1 wherein, said luminescent screens are substantially equidistant from said electron beam producing means.

3. A color television reproducing system as defined in claim 1 wherein, said luminescent screens are disposed in planes which are angularly related to one another.

4. A color television reproducing system as defined in claim 1 wherein, said luminescent screens are disposed substantially at right angles to one another.

5. A color television reproducing system as defined in claim 1 wherein, said luminescent screens are disposed in substantially parallel planes.

6. A color television reproducing system as defined in claim 1 and having additionally, a third luminescent screen capable of producing a third component image color, and means to derive from said electron beam and to direct to said third screen a third beam component having an intensity corresponding to the intensity of a third component color image.

7. A color television reproducing system as defined in claim 6 wherein, said third screen is disposed substantially at right angles to at least one of said two first-mentioned screens.

8. A color television reproducing system as defined in claim 6 wherein, said third screen is disposed in a plane substantially parallel to at least one of said two first-mentioned screens.

9. In a television system for reproducing an image substantially in its component colors from received video signals, a cathode ray tube having a plurality of luminescent screens capable respectively of producing light corresponding in color to component image colors, means to produce a single electron beam with which to scan and selectively excite said luminescent screens, and video signal-controlled, electron-optical means to direct substantially concurrent components of said scanning beam respectively to said luminescent screens in relative intensities corresponding to the relative intensities of said component image colors.

10. In a television system for reproducing an image substantially in its component colors from received video signals, a cathode ray tube having a plurality of luminescent screens capable respectively of producing component color images, means to produce a single electron beam and to deflect it relative to said luminescent screens in accordance with a predetermined pattern, and electron-optical means to direct substantially contemporaneous portions of said beam respectively to said luminescent screens, the relative intensities of said beam portions varying in accordance with the relative intensities of said component color images.

11. In a television system for reproducing an image substantially in its component colors from received video signals, a cathode ray tube having a plurality of luminescent screens capable respectively of producing component color images, means to produce a single electron beam and to deflect it relative to said luminescent screens in accordance with a predetermined pattern, and electron-optical means energizable in accordance with said received video signals to divide said beam into a plurality of components of varying relative intensities corresponding to the relative intensities of said component color images and to direct said beam components respectively to said luminescent screens.

12. In a television system for reproducing an image substantially in its component colors from received video signals, a cathode ray tube having a plurality of luminescent screens capable respectively of producing component color images, means to produce a single electron beam, a system to deflect said beam relative to said luminescent screens in accordance with a predetermined pattern, means energizable to divide said beam into a plurality of components and to direct said beam components respectively to said luminescent screens, and means controlling the energization of said beam-dividing means in accordance with said received video signals to vary the relative intensities of said beam components to correspond to the relative intensities of said component color images.

13. A television system for reproducing an image substantially in its component colors from received video signals comprising, a cathode ray tube having means to produce a single electron beam, means to deflect said electron beam in accordance with a predetermined pattern, a plurality of luminescent screens capable respectively of producing light corresponding in color to said component image colors, certain ones of said screens being located out of the normal path of said electron beam, a plurality of electron mirrors located in the normal path of said electron beam, certain ones of said electron mirrors being in positions to reflect respectively to associated ones of said certain screens portions of said electron beam, depending upon the energization of said certain electron mirrors, means to modulate the intensity of said electron beam in accordance with the video signals representing all of said component image colors, means to variably energize said electron mirrors in accordance with the video signals representing respective ones of said component image colors, and means to combine optically the component color images produced by said screens to form a composite color image.

14. A color television image-reproducing system as defined in claim 13 wherein, said cathode ray tube has three luminescent screens, two of said screens being located out of the normal path of said electron beam, and two electron mirrors associated respectively with said two screens.

15. A color television image-reproducing system as defined in claim 13 wherein, said cathode ray tube has three luminescent screens, all of said screens being located out of the normal path of said beam, and three electron mirrors associated respectively with said screens.

16. A color television image reproducing system as defined in claim 13 wherein, said received video signals comprise individual groups of signals representative respectively of a plurality of component image colors, and including additionally means for combining said individual groups of video signals to form a composite video signal with which to modulate the intensity of said electron beam, and means to impress upon said certain electron mirrors only certain ones of said groups of video signals.

17. A color television image-reproducing system as defined in claim 16 wherein, said received video signals comprise individual groups of signals representative respectively of three component image colors, and two of said groups of video signals being impressed respectively upon two of said electron mirrors.

18. A color television image-reproducing system as defined in claim 13 wherein, said received video signals comprise a group of polychromatic signals to modulate the intensity of said electron beam and additional groups of signals representative respectively of certain ones of a plurality of component image colors, and means to impress said additional groups of video signals respectively upon said certain electron mirrors.

19. A color television image-reproducing system as defined in claim 18 wherein, said received video signals comprise two additional groups of signals representative respectively of two of three component image colors for impression respectively upon two of said electron mirrors.

20. In a television system for reproducing an image substantially in its component colors from received video signals, a cathode ray tube having a plurality of luminescent screens capable respectively of producing component color images, means to produce a single electron beam and to deflect it relative to said luminescent screens in accordance with a predetermined pattern, and video signal-controlled electron-optical means to separate said beam into a plurality of components having different respective ranges of electron velocities and to direct said beam components respectively to said luminescent screens in relative intensities corresponding to the relative intensities of said component color images.

21. In a television system for reproducing an image substantially in its component colors from received video signals, a cathode ray tube having a plurality of luminescent screens capable respectively of producing component color images, means to produce a single electron beam and to deflect it relative to said luminescent screens in accordance with a predetermined pattern, means including an electrode system energizable to separate said beam into a plurality of components having different respective ranges of electron velocities and to direct said beam components respectively to said luminescent screens, and means controlling the energization of said electrode system in accordance with said received video signals to vary said respective ranges of electron velocities, and thus the relative intensities of said beam components, to correspond to the relative intensities of said component color images.

22. In a television system for reproducing an image substantially in its component colors from received video signals, a cathode ray tube having a plurality of luminescent screens capable respectively of producing component color images, means to produce a single electron beam, a system to deflect said beam relative to said luminescent screens in accordance with a predetermined pattern, means including a series of electron velocity filters energizable to separate said beam into a plurality of components having different respective ranges of electron velocities and to direct said beam components respectively to said luminescent screens, and means controlling the individual energization of said velocity filters in accordance with said received video signals to vary said respective ranges of electron velocities, and thus the relative intensities of said beam components, to correspond to the relative intensities of said component color images.

GEORGE C. SZIKLAI.
FRANCIS J. DARKE, Jr.

References Cited in the file of this patent

UNITED STATES PATENTS

| Number | Name | Date |
|---|---|---|
| 2,335,180 | Goldsmith | Nov. 23, 1943 |
| 2,521,010 | Homrighous | Sept. 5, 1950 |
| 2,552,386 | Sziklai | May 8, 1951 |